United States Patent [19]

Moran, III et al.

[11] Patent Number: 5,187,742
[45] Date of Patent: Feb. 16, 1993

[54] CIRCUITRY FOR INTERFACING TELECOMMUNICATIONS EQUIPMENT TO A COMMUNICATION CHANNEL

[75] Inventors: John L. Moran, III, Millville; L. Robert Schissler, Jamaica Plain, both of Mass.

[73] Assignee: Codex Corporation, Mansfield, Mass.

[21] Appl. No.: 464,292

[22] Filed: Jan. 12, 1990

[51] Int. Cl.$^5$ ............................................... H04B 1/58
[52] U.S. Cl. .................................... 379/403; 379/398; 379/402; 379/400
[58] Field of Search .................... 379/340, 394, 398, 3, 379/400, 401, 402, 403, 404

[56] References Cited

U.S. PATENT DOCUMENTS

| | | | |
|---|---|---|---|
| 3,982,080 | 9/1976 | Ukeiley | 379/403 |
| 4,096,361 | 6/1978 | Crawford | 379/403 |
| 4,178,569 | 12/1979 | Reutter et al. | 379/402 |
| 4,278,848 | 7/1981 | Rizzo et al. | 379/403 |
| 4,368,361 | 1/1983 | Chung et al. | 379/404 |
| 4,498,018 | 2/1985 | Lofmark | 379/402 |
| 4,746,881 | 5/1988 | Suzuki et al. | 379/340 |
| 4,807,283 | 2/1989 | Pyhalammi | 379/404 |
| 4,989,243 | 1/1991 | Choi | 379/402 |

Primary Examiner—James L. Dwyer
Assistant Examiner—Stella L. Woo
Attorney, Agent, or Firm—Darleen J. Stockley

[57] ABSTRACT

Measuring the programming resistor in a data jack by placing the resistor in an AC voltage divider circuit via a transformer. An AC voltage (preferably generated by the modem's own transmitter circuitry) is applied to the voltage divider circuit, and an AC voltage measurement (preferably made by the modem's A/D converter) provides the resistance of the programming resistor. Matching the low-pass filter impedance characteristic of a local loop with a network having a matching low-pass filter characteristic, while also compensating the received signal with a compensation network having a high-pass filter characteristic, to reduce the frequency dependent gain effects caused by the matching network and/or the local loop.

7 Claims, 7 Drawing Sheets

CIRCUITRY FOR INTERFACING TELECOMMUNICATIONS EQUIPMENT TO A COMMUNICATION CHANNEL

BACKGROUND OF THE INVENTION

This invention relates to the interface between telecommunications equipment and a communication channel, e.g., the interface between a modem and a two wire telephone line.

Interfacing communications equipment to a two-line communication channel, such as the local loop of a phone line, where signals are to be transferred in both directions in the same frequency range generally requires a circuit called a hybrid. The hybrid performs the function of cancelling out the locally transmitted signal from the remotely transmitted signal. In modems, this circuit may take the form of a simple op-amp subtractor circuit.

Two issues that arise in designing hybrids are echoes and imperfect subtraction of the local transmitted signal, also known as immediate near-end echo. Echoes arise wherever there is a mismatch in impedance in the local loop, and thus the designer may reduce the amount of echo in the system by matching the impedance of the hybrid to that of the local loop.

One factor that may cause imperfect subtraction of the local transmitted signal is an incorrect matching of the input and feedback impedances around the op-amp in the subtractor circuit. These impedances, as is well known in the art, determine the gain of signals input into the overall op-amp circuit. If the impedance of the inverting branch of the op-amp circuit, for example, is different than the impedance of the local loop, the circuit will not cancel all of the local transmitted signal.

The impedance of the local loop contributes to the impedance of one branch of the amplifier circuit, and hence can affect the operation of the hybrid circuit. Thus, matching the impedance of the op-amp circuit impedance elements with the local loop impedance will allow the designer to cancel the local transmitted signal more completely.

Matching the impedance is made more difficult by several factors. One of these factors is the fact that the impedance of the local loop is not purely resistive. In practice, the local loop usually possesses the characteristics of a low-pass filter.

Another factor affecting impedance matching is that the transformers typically have non-ideal characteristics, and tend to have unpredictable impedances at low frequencies. One solution to this problem is to use better transformers, but these tend to be expensive and bulky.

Yet another problem with matching the impedance is the length of the local loop in the system, as the length of the loop affects the impedance. This is relatively easy to correct for if the length of the local loop is known.

One solution to this problem is made possible by the widespread use of data jacks, for example RJ 41S, RJ 45S or RJ 4MB jacks. These jacks include a resistor which a technician chooses upon installation of the jack based on the local loop loss, which can be translated into length. This resistor is known as the programming resistor. Although the primary function of the programming resistor is to provide an indication of loop loss in order to adjust transmitter output power for maximum dynamic range, it may also be used as a basis for switching the values of the op-amp impedances to better match them with the local loop impedance.

In these RJ 41S, RJ 45S and RJ 4MB jacks, the insulation between the pins can be insufficient to prevent high-voltage spikes from jumping to the programming resistor pins of the jack, and from there entering the modem. Thus, measuring the programming resistor by putting it into a low-voltage divider circuit, or using the programming resistor in the actual transmit circuit, can lead to damage of the modem circuitry.

SUMMARY OF THE INVENTION

In general, in a first aspect, the invention features measuring the value of the programming resistor and using that measurement to vary the impedance of the impedance matching network, thereby providing improved impedance matching of the modem to the local loop. In preferred embodiments, the matching network has a plurality of impedance elements, and circuitry is provided for selecting one of the elements based on the measured value of the programming resistor.

In a second aspect, the invention features matching the low-pass filter impedance characteristic of the local loop with a network having a matching low-pass filter characteristic, while also compensating the received signal with a compensation network having a high-pass filter characteristic. The compensation network tends to reduce the frequency dependent gain effects caused by the matching network and/or the local loop. It reduces echo noise on the communication channel, and it has the added benefit of reducing low-frequency echo noise introduced by the non-ideal behavior of the coupling transformer. Both the matching network and the compensation network may be switchable in order to accommodate different loop lengths, e.g., based on a measurement of the programming resistor.

In a third aspect, the invention features measuring the programming resistor by placing it an AC voltage divider circuit via a transformer. An AC voltage (preferably generated by the modem's own transmitter circuitry) is applied to the voltage divider circuit, and an AC voltage measurement (preferably made by the modem's A/D converter) calculates the resistance of the programming resistor. In preferred embodiments, the measurement is calibrated by storing two measurements, one corresponding to the resistor being removed and the other to it being shorted. The invention provides a simple and effective means of measuring the value of the programming resistor without the risk of the modem being harmed from voltage spikes, and without the need for additional AC generators or measurement circuits.

In a fourth aspect, the invention features using the same AC voltage divider and transformer for detecting switch closure on the data jack, such as that provided by an exclusion key telephone.

In a fifth aspect, the invention features designing the impedance of the matching network to match the impedance of the build-out at the central office.

Other features and advantages of the invention will be apparent from the following description of a preferred embodiment and from the claims.

DESCRIPTION OF THE PREFERRED EMBODIMENT

Figure 1:
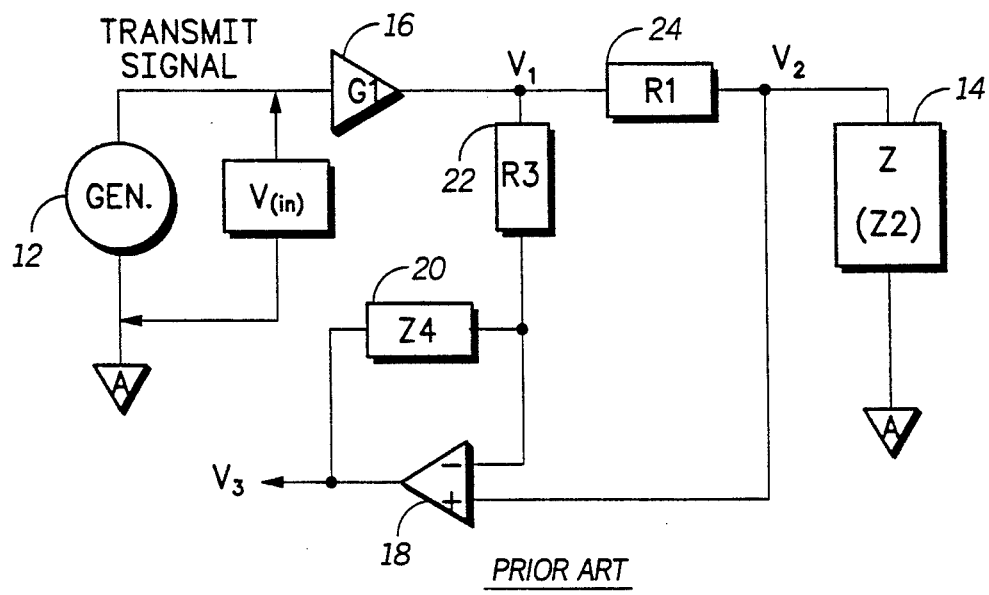
FIG. 1 is a schematic of a prior art hybrid.

A typical hybrid circuit for a modem includes analog op-amp subtraction circuitry such as that shown in FIG. 1. In this figure, a transmit signal is generated by transmit signal generator 12. This signal is amplified by amplifier 16 (which may derive its gain from a programming resistor in the modem's data jack). The amplified signal propagates through resistor 24 and on out to the communication channel. Usually, the signal must propagate through a transformer in order to reach the local loop. The impedance "looking through" this transformer at the local loop is represented by lumped impedance 14.

An op-amp 18, resistors 20, 22, 24, and lumped impedance 14 form a subtractor. By conventional op-amp design rules, the voltage $V_3$ at the output of the op-amp 18 is related to the resistances of resistors 20, 22, 24 and lumped impedance 14 as follows:

$$V_3 = V_2 \cdot \frac{Z_4 + R_3}{R_3} - V_1 \cdot \frac{Z_4}{R_3} \text{ and:}$$

$$V_2 = V_1 \cdot \frac{Z_2}{R_1 + Z_2}$$

If $(Z_4/R_3) = (Z_2/R_1)$ then a balanced condition exists, and:
$V_3 = [V_1*[(Z_2/(R_1+Z_2)*[(Z_4+R_3)/R_3 - V1*(Z_4/R_3)]$
$= 0$ Signals received on the local loop in this balanced condition will be found at the output of the op-amp free of any transmitted signals, even though the received and transmitted signals share the local loop. The received signal may then be further processed in conventional ways.

Given that all real circuit elements have tolerances, the balance condition will never be perfect. Thus, the cancellation will be imperfect and the hybrid will attenuate the immediate near-end echo rather than cancel it. The degree to which the hybrid is able to attenuate the immediate near-end echo signal will determine the level of interference passed on to further stages of the modem.

Figure 2:
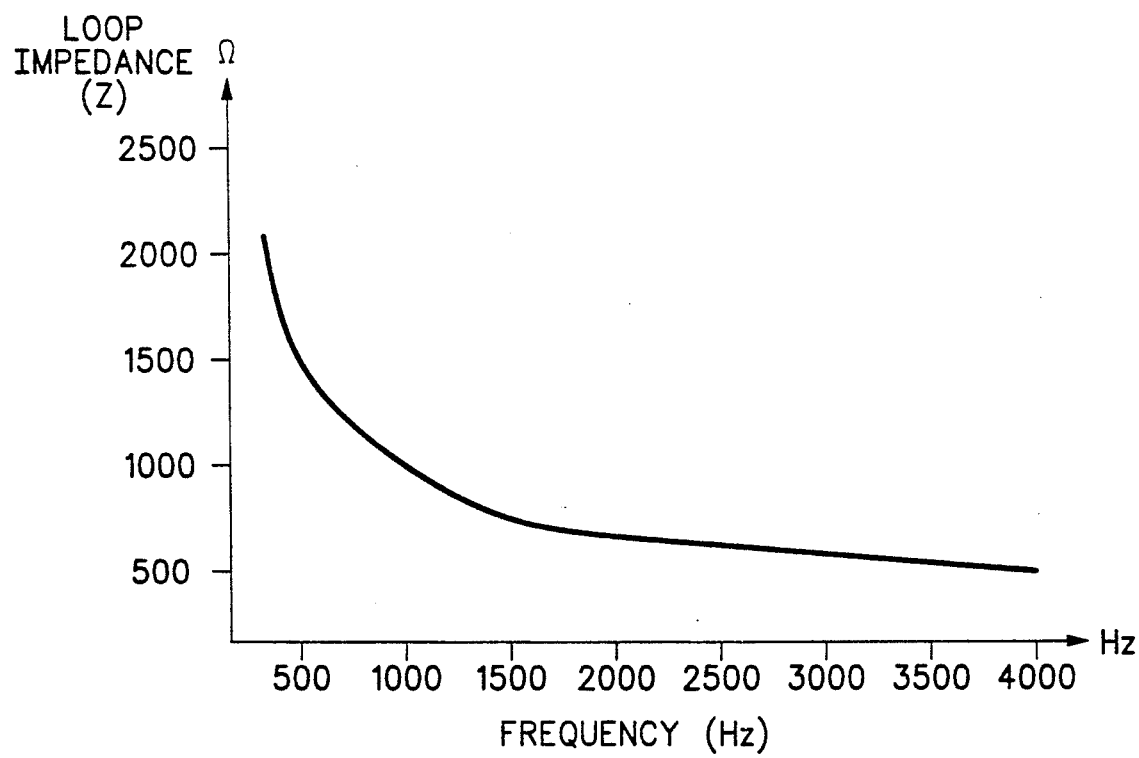
FIG. 2 is a plot of the impedance of a local loop with respect to frequency.

In order to improve the balance of the subtraction network, $Z_4$ should be closely matched to $Z_2$. In practice, it is noted that the local loop is not purely resistive, but has a reactive component. FIG. 2 is a plot of the impedance vs. frequency for a local loop, in this case the local loop being 18,000 feet of 26 gauge PIC cable at 20° C. This plot demonstrates a clear low-pass filter characteristic, and thus $Z_4$ should also exhibit a low pass filter characteristic.

Figure 10:
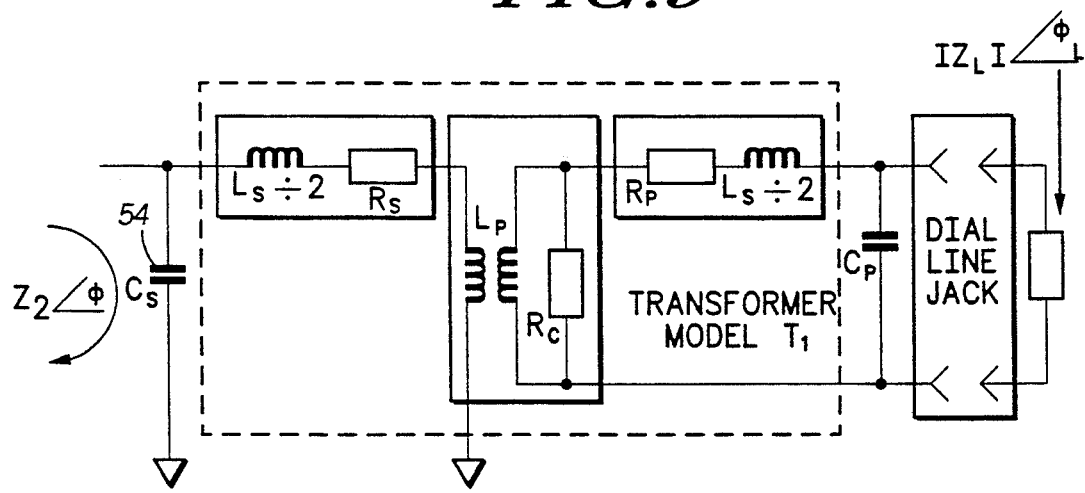
FIG. 10 is a model of the modem's local loop interface transformer with respect to the impedance it presents to the hybrid circuit.

In designing $Z_4$ to match $Z_2$, the transformer characteristics should be accounted for. FIG. 10 is a model of the transformer 52. From this figure, it will be appreciated that the impedance $Z_2$ will be given by the following equation:

$$Z_2 \angle -\phi = 1/Y_2 \angle \phi \text{ Where:}$$

$$Y_2 \angle \phi = j\omega C_s + [1/[R_{s+j}\omega L\tfrac{s}{2} +$$

$$\left[1/\left[\left(\frac{1}{R_c} + \frac{1}{j\omega L_p}\right)+\right.\right.$$

$$[1/[R_p + j\omega L \tfrac{s}{2} + [1/(j\omega C_p + 1/Z_{line} \angle \phi)]]]]]]$$

Figure 3:
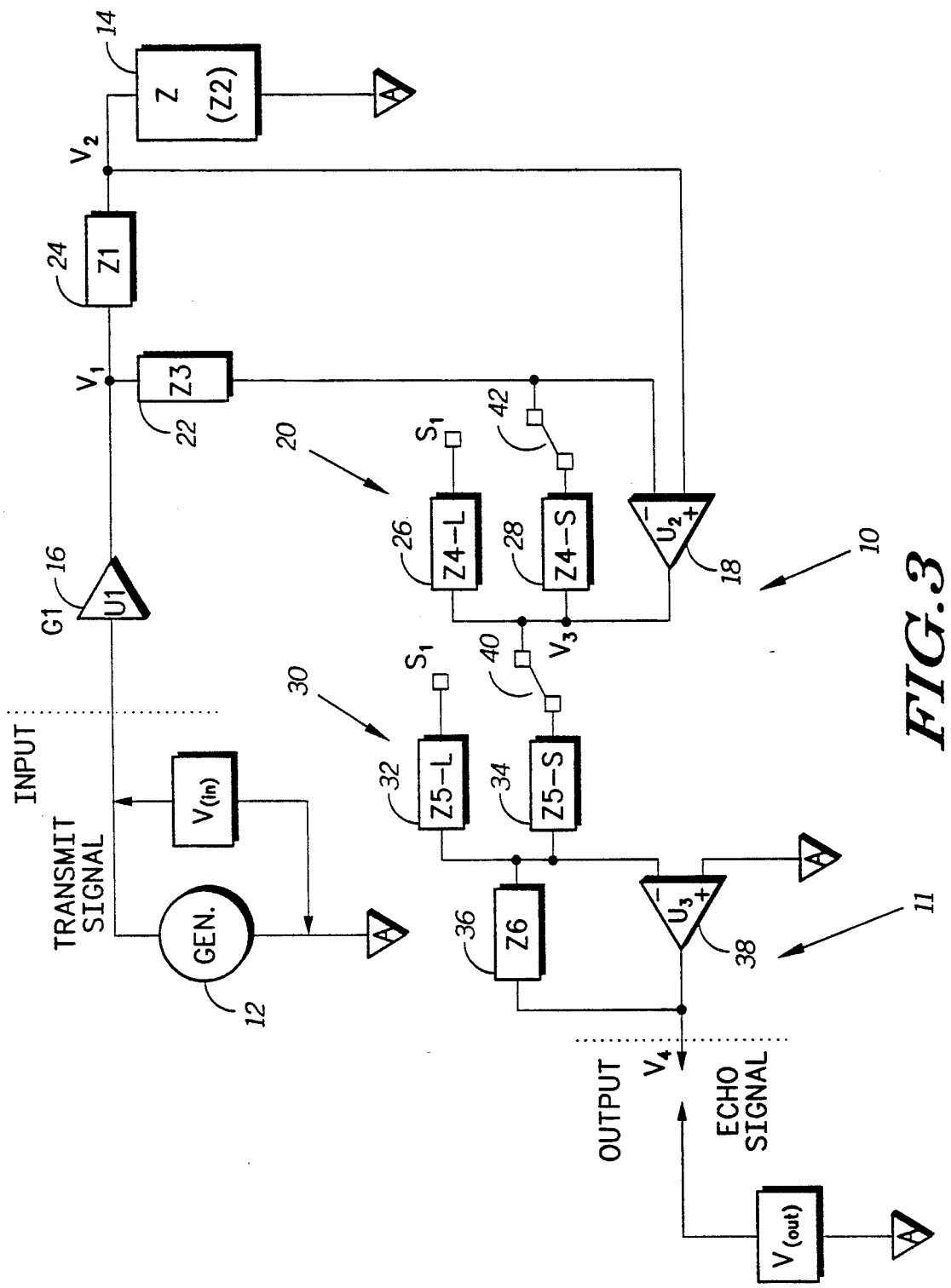
FIG. 3 is a schematic of the improved hybrid of the invention.

Referring to FIG. 3, it can be seen that the low pass filter characteristic of the hybrid circuit may include a switch 42 which alters the impedance of $Z_4$. It should be noted that, although the drawings show two impedances, there can be as many impedances as there are possible programming resistor values, and thus $Z_4$ could have more positions. The position of this switch will depend on the loop length, as determined by the programming resistor. Thus, longer loops will be balanced by a different network than shorter loops.

The received signal has now undergone three low-pass filtering operations, the first two being those of the local loops themselves, and the third being that of the matching network. This means that the high frequencies will have been attenuated significantly with respect to the low frequencies. In order to compensate for this attenuation, hybrid compensation circuitry 11 is added after the analog subtraction circuitry 10. This hybrid compensation circuitry 11 has a high pass filter characteristic which compensates for the attenuation of the high frequency components in the local loop and in the analog subtraction circuitry 10.

The implementation of the high pass filter characteristic is a straightforward op-amp circuit including op-amp 38, impedances 36, 32 and 34 and switch 40. The switched impedances allow the characteristics of the hybrid compensation circuitry 11 to complement those of the analog subtraction circuitry 10 in relation to the programming resistor. As for switch 42, switch 40 may include more than two positions and related impedances. Switches 40 and 42 would typically be ganged.

Another feature of this circuit is that it not only compensates for the attenuation in the local loops and the analog subtraction circuitry but it also reduces the overall echo power. This is because there is more echo present at low frequencies, and by de-emphasizing these frequencies during high pass filtering the overall echo power measured at the output of op-amp 38 will be lower than that at the output of op-amp 18. The reason that there is more echo at low frequencies is that the non-ideal transformer 52 tends to have a less predictable impedance at these frequencies making it difficult to match reliably with a matching network.

Figure 5:
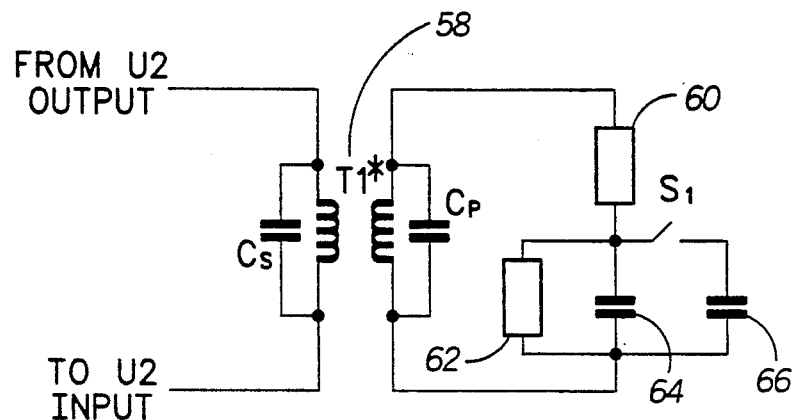
FIG. 5 is a schematic of the ideal switchable feedback element for the compensation circuit.
Figure 6:
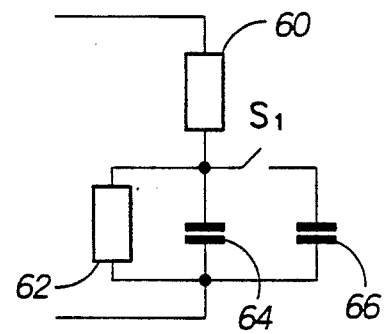
FIG. 6 is a schematic of a second feedback element for the compensation circuit.

Ideally, the $Z_5$ compensation network could be the one presented in FIG. 5. In this circuit the frequency-dependence of the compensation transformer 58 compensates for the similar frequency dependence of the transformer 52, while resistors 60, 62 and capacitors 64, 66 provide the high-pass filter effect. This is an expensive solution, however, and in the interest in economy the preferred network would usually be that of FIG. 6.

In a effort to provide further compensation for the non-ideal characteristics of the transformer 52 (FIG. 4), capacitor 54 has been added in order to keep the impedance of $Z_2$ capacitive at all times. Similarly, capacitors 25 and 56 have been added to keep the input impedance of the modem capacitive at all times.

Figure 11:
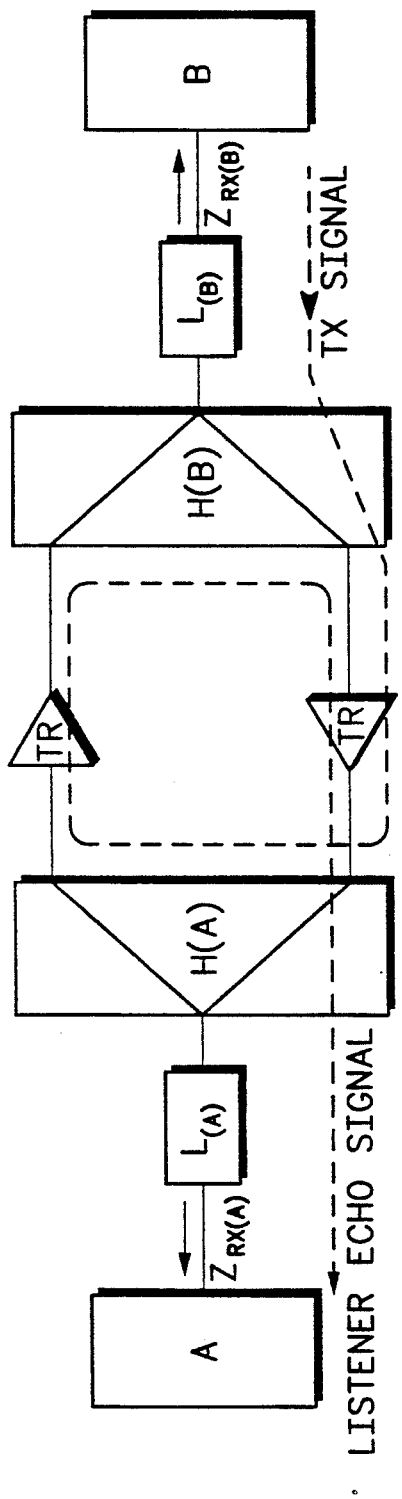
FIG. 11 is a diagram illustrating the concept of listener echo.
Figure 12:
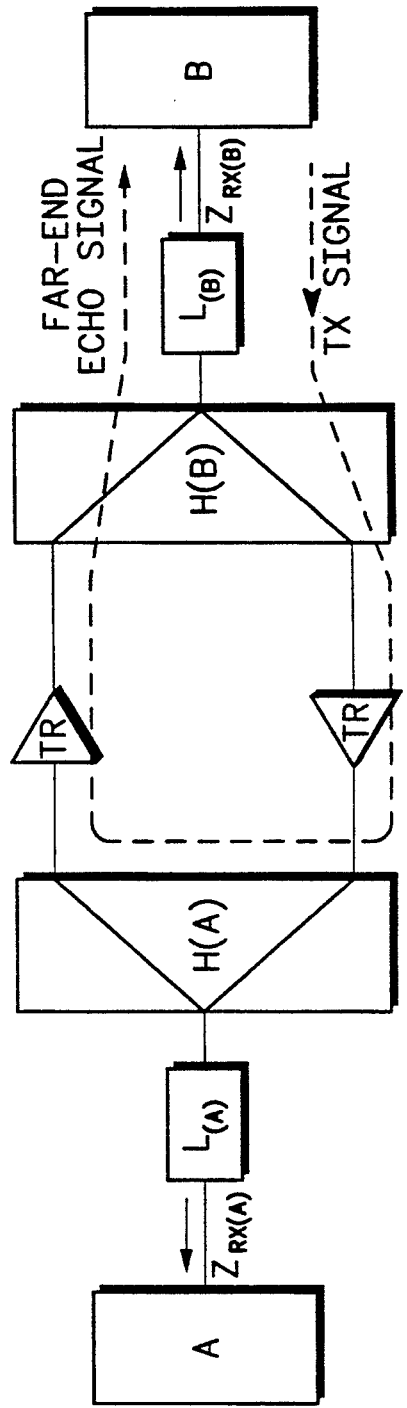
FIG. 12 is a diagram illustrating the concept of far end echo.

In general, the input impedance of the modem should be made to match that of the impedance of the local loop. This reduces listener echo in the channel. Listener echo is the echo from the transmitted signal that is received by a receiving modem, and is illustrated in FIG. 11. Additionally, matching the impedance of the line will reduce the amount of far end echo experienced by a complementary modem when transmitting. The concept of far end echo is illustrated in FIG. 12.

Figure 4:
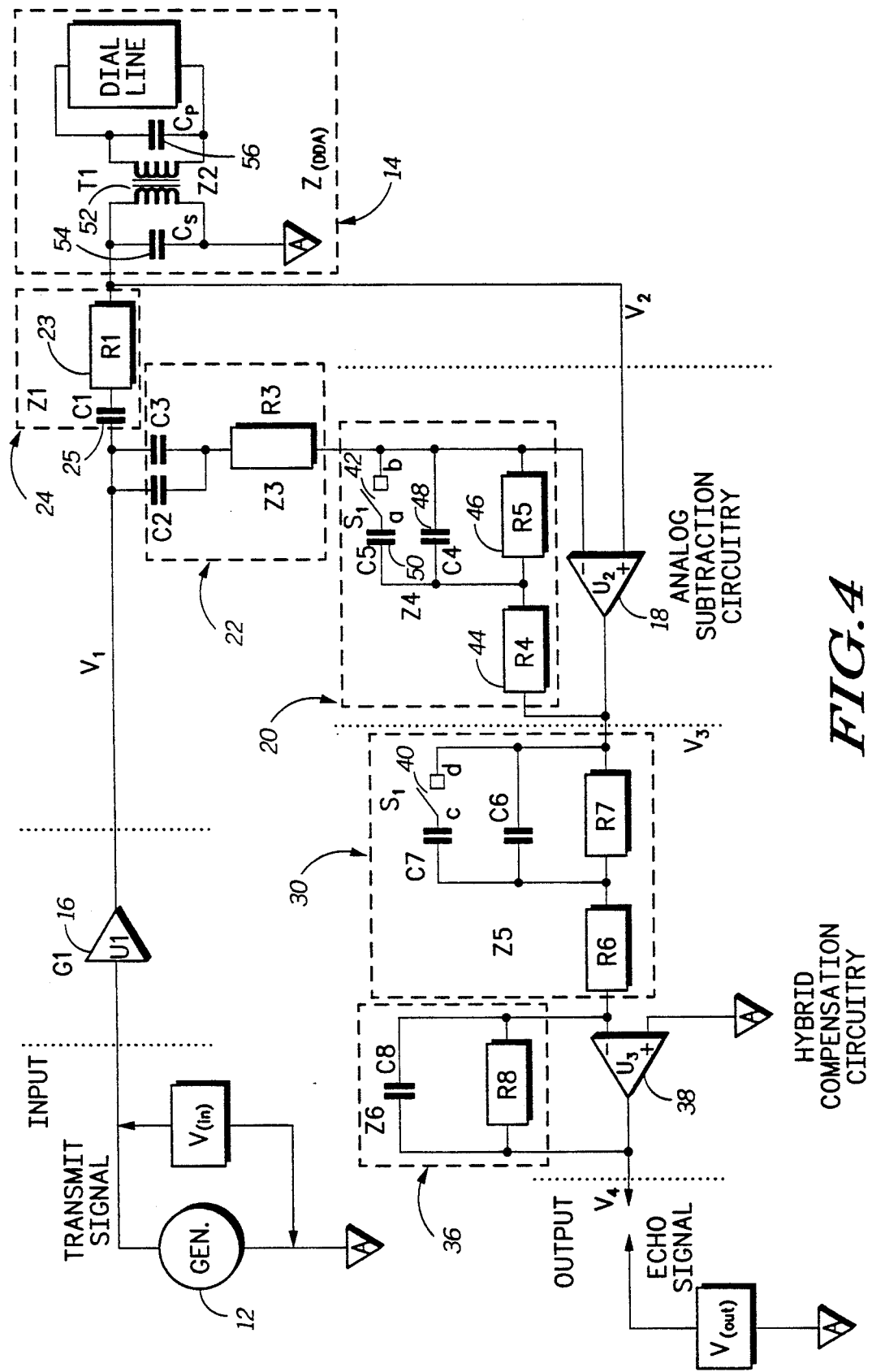
FIG. 4 is a more detailed schematic of the improved hybrid of the invention.

To match the input impedance of the modem, $Z_1$ is made complex by adding a capacitor $C_1$ in series with $R_1$(FIG. 4). Now that $Z_1$ is complex, $Z_3$ must also be made complex as shown in FIG. 4, in order to balance the analog cancellation circuitry properly.

In very short loops, (under 3,000 feet) the impedance of the central office build-out, not the line itself, dominates the impedance of the local loop, and hence the input impedance of the modem should match this value. This can be done by switching in impedance values that are designed to match the impedance of the central office build-out for values of the programming resistor which indicate a short local loop.

Figure 9:
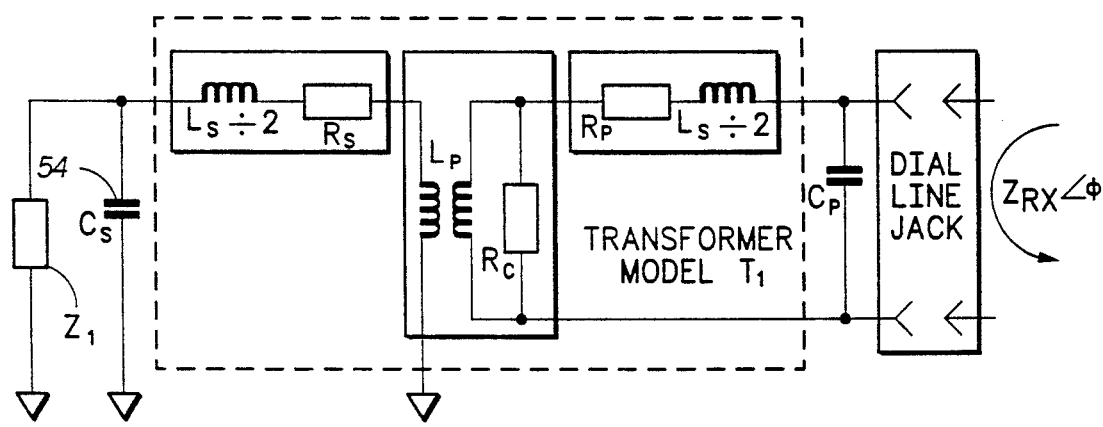
FIG. 9, is a model of the modem's local loop interface transformer with respect to the impedance it presents to the local loop.

FIG. 4 shows additional detail on the implementation of the circuits of FIG. 3. Determination of the values of impedance $Z_1$, $C_p$ and $C_s$ requires the designer to consider the transformer's internal parameters. FIG. 9 is a model of the transformer 52. The impedance presented to the line by the transformer ($Z_{RX} \angle \phi$) may be found by solving:

$$Z_{RX} \angle -\phi = 1/Y_{RX} \angle \phi \quad \text{Where:}$$

$$Y_{RX} \angle \phi = j\omega C_p + [1/ [R_p - j\omega L_{\frac{s}{2}} +$$

$$\left[ 1/ \left[ \left( \frac{1}{R_c} + \frac{1}{j\omega L_p} \right) + \right. \right.$$

$$[1/[R_s + j\omega L_{\frac{s}{2}} + [1/(j\omega C_s + 1/Z_1 \angle \phi)]]]]]]$$

It should be noted that $C_p$ and $C_s$ serve both for line matching and for leakage inductance cancellation.

Figure 7:
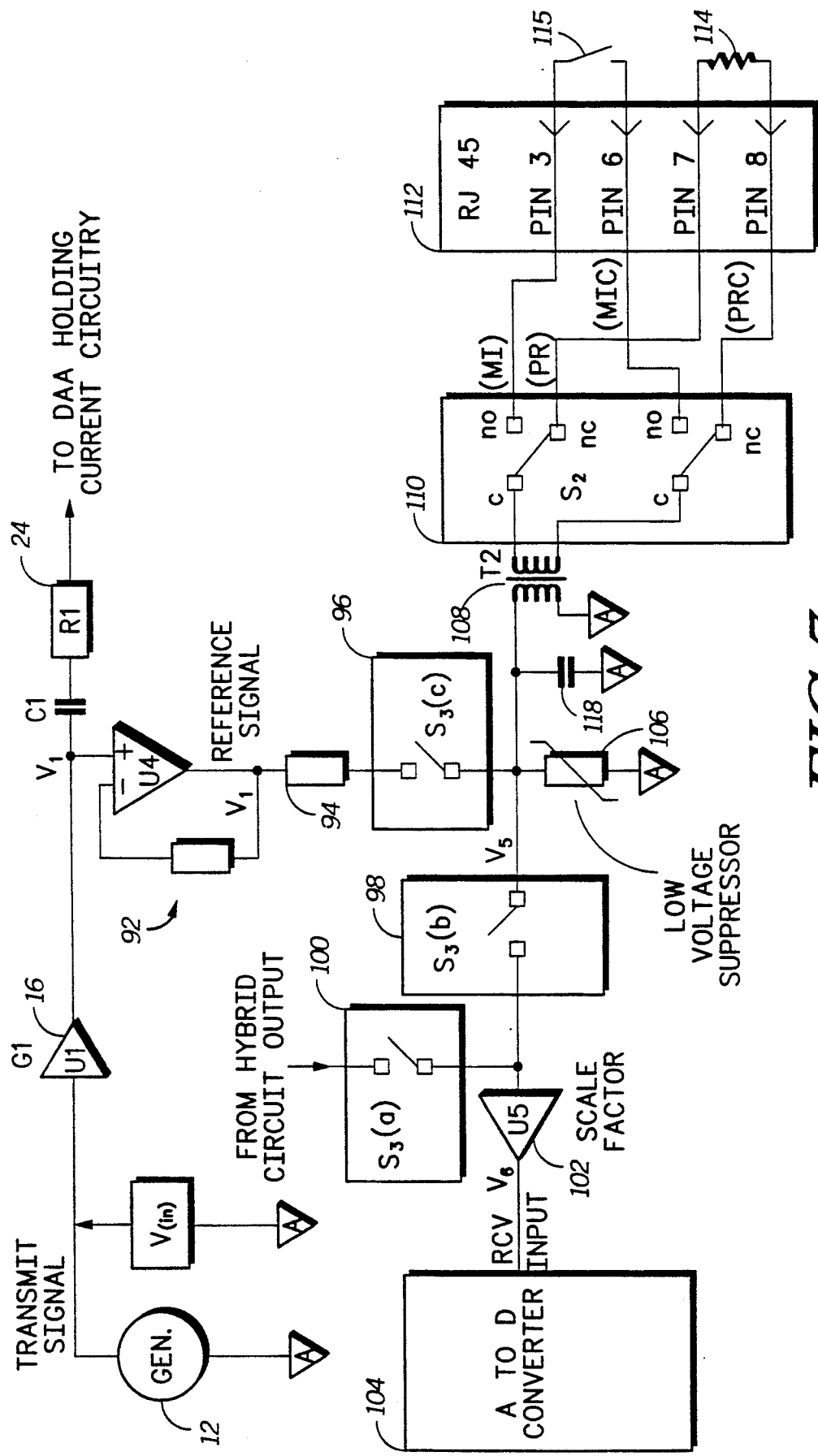
FIG. 7 is a schematic of the circuitry responsible for measuring the value of the programming resistor.

In order to determine the local loop length and thus set the switches 40, 42 and the gain of amplifier 16, the modem must read the programming resistor. FIG. 7 shows circuitry for performing this function. The primary windings of a transformer 108 are connected, via a relay 110 to pins 7 and 8 of the modem's jack 112. When inserted into its counterpart data jack, pins 7 and 8 will be connected to the leads of a programming resistor 114. Thus, the impedance of the secondary windings of the transformer 108 will ideally be that of the resistor 114 multiplied by the square of the turns ratio, as is well known in the art. In practice, the transformer may have a turns ratio of 1:1.

The secondary windings of the transformer 108 are connected, via a switch 96, to resistor 94. This resistor and the impedance of the secondary windings of the transformer 108 form a voltage divider. This voltage divider requires an AC voltage. The modem's signal generator may be used to provide this AC voltage, as the modem never needs to be communicating during the reading of the programming resistor. Thus, the output of the amplifier 16 is connected to buffering amplifier 92, which is, in turn, connected to switch 96.

Switch 96 is preferably an analog multiplexer, which also includes switches 98, 100. These switches 96, 98, 100 are preferably ganged. This multiplexer is controlled by the modem's central processor (not shown), which will not be discussed in great detail here as the use of microprocessors in the control of modems is well known.

When switch 96 is closed, and the transmit signal generator 12 is programmed to put out a simple AC waveform, the voltage divider formed by resistor 94 and the secondary winding of transformer 108 will generate a voltage $V_5$ representative of the resistance value of the programming resistor 114. This voltage may then be measured. It is convenient to measure the voltage with the modem's analog-to-digital converter 104. Switch 98 connects this converter to the central terminal of the voltage divider when the measurement is to be performed. A scale factor 102 may adjust the voltage divider output to match the range of the analog-to-digital converter 104 with the range of possible output values from the voltage divider.

Figure 8:
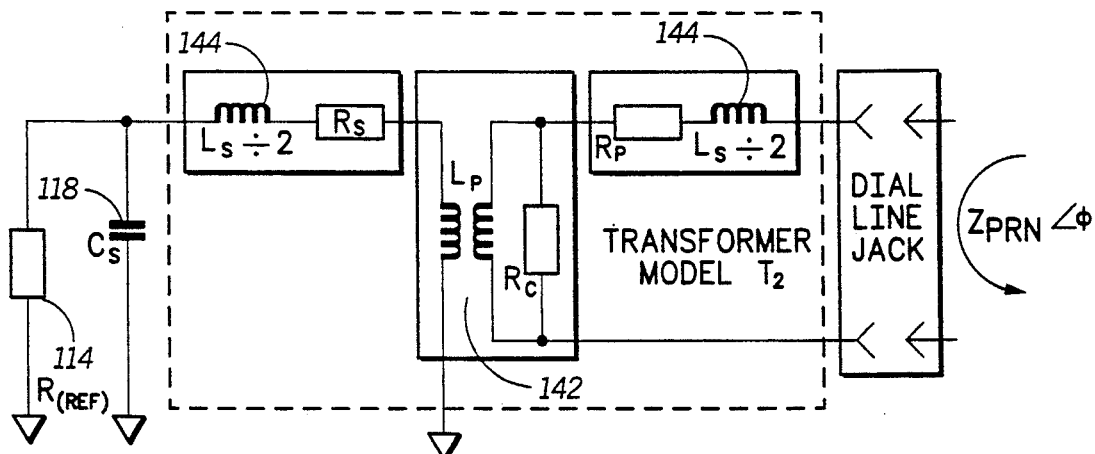
FIG. 8 is a model of the programming resistor transformer impedance.

Since the transformer 108 is also non-ideal, its characteristics must be taken into account. Referring to FIG. 8, capacitor 118 can minimize the effects of the leakage inductance 144 and primary inductance 142 if a single frequency is used in the voltage divider. Other non-ideal characteristics of the transformer may be compensated for by performing the following procedure for each modem. First, with the measurement value equal to zero (pins 7 and 8 shorted), the voltage at the output of scale factor 102 is measured and the complex value of this voltage is recorded. Then, with the programming resistor not present (open), the voltage at the output of scale factor 102 is measured and the complex value of this voltage is recorded. Then, actual measurements are made with the programming resistor connected across pins 7 and 8. Using the results of the open, shorted, and actual measurements, it is possible to infer the value of the programming resistor, the transmit power level, and the choice of matching network as a function of the following corrected ratio:

$$\text{Corrected ratio} = \frac{\text{Measured voltage} - \text{Shorted voltage}}{\text{Open voltage} - \text{Shorted voltage}}$$

Note that these values are complex values. The corrected ratio will be a real number if the impedance of the transformer presented to the programming resistor on pins 7 and 8 is real. When using an RJ 41S, RJ 45S or RJ MB type jack, it is advantageous to make this real resistance equal to 1780Ω, as that is the geometric mean of the available programming resistor values. If a real impedance is used, the program resistor value may be determined by solving the following equation for the $R_{(PR)}$:

$$\text{Corrected ratio} = \frac{R_{(PR)}}{R_{(PR)} + R_{(REF)}}$$

Where $R_{(REF)}$ is the resistance presented to the programming resistor by the transformer.

In order to determine the optimum values for resistor 94 and capacitor 118 which will cause a real impedance of the desired value to be presented to the programming resistor on pins 7 and 8, it is necessary to take the behavior of the transformer into account. A model for use in this type of calculation is presented in FIG. 8. From the model, it may be shown that the impedance presented to the program resistor ($Z_{PRN}\angle\phi$) may be determined using the following equation:

$$Z_{PRN}\angle\phi = R_p + j\omega L_{\frac{s}{2}} + \left[1/\left[\left(\frac{1}{R_c} + \frac{1}{j\omega L_p}\right) + [1/[R_s + j\omega L_{\frac{s}{2}} + [1/(j\omega C_s + 1/R_{94})]]]\right]\right]$$

The open and shorted measurements may be performed by a technician upon assembly of the modem and stored in a non-volatile memory location (not shown) within the modem. The modem's central processor (not shown) may then perform the above resistor calculations and use the results to control the multiplexer switches in the analog subtraction circuitry 10 and the hybrid compensation circuitry 11, and to control any other part of the modem that depends on the value of the programming resistor.

In the RJ 41S, RJ 45S and RJ 4MB data jacks, provisions exist for the use of an exclusion key telephone. An exclusion key telephone signals to the modem by providing a short circuit or an open circuit between pins 3 and 6 of the jack 112. This is represented diagrammatically in by switch 115. The opening and closing of this switch may be detected in the same manner used to determine the resistance of the programming resistor, after the relay 110 has been actuated to connect the primary wires of the transformer 110 to pins 3 and 6 of the jack 112. Control of relay 110 is also performed by the modem's central processor.

In prior art modems, simple logic gates read the status of this switch. Logic gates, however, will not withstand high voltage surges, and hence these prior art modems tend to be more damage-prone.

The electrical characteristics of the transformer 108 are sufficient to attenuate any large surge that might be present at pins 3, 6, 7 or 8. Low voltage suppressor 106 may absorb any remaining energy.

Table 1 presents actual values used in an experimental modem, as an example of a possible implementation.

TABLE 1

| | |
|---|---|
| $R_1$ | 332 Ω |
| $R_2$ | None |
| $R_3$ | 7,320 Ω |
| $R_4$ | 7,320 Ω |
| $R_5$ | 27,400 Ω |
| $R_6$ | 7,320 Ω |
| $R_7$ | 24,300 Ω |
| $R_8$ | 16,200 Ω |
| $C_1$ | 2.2 μF |
| $C_2$ | 0.033 μF |
| $C_3$ | 0.033 μF |
| $C_4$ | 0.0033 μF |
| $C_5$ | 0.0033 μF |
| $C_6$ | 0.0033 μF |
| $C_7$ | 0.0033 μF |
| $C_8$ | 0.0015 μF |

Table 2 presents the values of the parameters of the transformer model used in this implementation.

TABLE II

| | |
|---|---|
| $L_s/2$ | = 5.2 mH |
| $R_s$ | = 190 Ω |
| $L_p$ | = 600 mH |
| $R_c$ | = 63,000 Ω |
| $R_p$ | = 110 Ω |
| $C_s$ | = 0.033 μF |
| $C_p$ | = 0.022 μF |

Other embodiments are within the scope of the following claims. For example, $Z_4$ and $Z_5$ could be altered by switching resistors instead of capacitors or could be altered by switching a combination of resistors and capacitors.

What is claimed is:

1. A hybrid circuit for coupling communication circuitry to the local loop of a communication channel, the length of said local loop being expressed by the value of a programming resistor, said hybrid circuit having a local loop input for receiving data from said local loop, a transmit input for accepting data to be transmitted on said local loop, and a receive output for delivering to the communication circuitry a signal representative of data received over said local loop, said hybrid circuit comprising:

an impedance matching network for matching the impedance at said local loop input to the impedance of said local loop, said matching network having a low-pass filter characteristic; and circuitry for measuring the value of said programming resistor and varying the impedance of said impedance matching network based on the measured value wherein said impedance matching network further includes a plurality of impedance elements, and where said circuitry includes a switch for selecting one of said impedance elements based on the measured value of a programming resistor to compensate for the effects of the loop on a transmitted signal.

2. A hybrid circuit for coupling communication circuitry to a local loop, said hybrid circuit having a local loop input for receiving data from said local loop, a transmit input for accepting data to be transmitted on said local loop, and a receive output for delivering to the communication circuitry a signal representative of data received over said local loop, said hybrid circuit comprising:

an impedance matching network for matching the impedance at said local loop input to the impedance of said local loop, said matching network having a low-pass filter characteristic; and a compensation network operating on said receive output, said compensation network having a high-pass filter characteristic tending to reduce frequency dependent gain effects in correspondence with said impedance matching network, wherein said compensation network has at least one of:

A) a characteristic tending to reduce the frequency dependent gain effects of said matching network, and B) a characteristic tending to reduce the frequency dependent gain effects of said local loop.

3. The circuit of claim 2 further comprising means for altering the low-pass filter characteristic of said matching network based on information representative of the length of the loop forming the local end of said local loop.

4. The circuit of claim 3 wherein said information is the value of a resistor, and said means comprises means for measuring the resistance value of a resistor.

5. The circuit of claim 3 further comprising means for providing a compensating alteration to the high-pass filter characteristic of said compensation network to compensate for alterations to the low-pass filter characteristic of said matching network.

6. The hybrid circuit of claims 3, 4, or 5 wherein said impedance matching network further includes
   a plurality of impedance elements, one of said elements being selected based on the measured value of a programming resistor.

7. A hybrid circuit for coupling communication circuitry to the local loop of a communication channel, said hybrid circuit having a local loop input for receiving data from said local loop, a transmit input for accepting data to be transmitted on said local loop, and a receive output for delivering to the communication circuitry a signal representative of data received over said local loop, said local loop having a line and a central office build-out, said hybrid circuit comprising:
   an impedance matching network for matching the impedance at said local loop input based on the impedance of the build-out of the central office,
   wherein the length of said local loop is expressed by a programming resistor having a value in correspondence with the length of said local loop for compensating for the effects of the loop on a transmitted signal.

* * * * *